(12) United States Patent
Garera et al.

(10) Patent No.: US 10,915,557 B2
(45) Date of Patent: Feb. 9, 2021

(54) PRODUCT CLASSIFICATION DATA TRANSFER AND MANAGEMENT

(71) Applicant: WAL-MART STORES, INC., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 788 days.

(21) Appl. No.: 14/847,944

(22) Filed: Sep. 8, 2015

(65) Prior Publication Data

US 2015/0379115 A1 Dec. 31, 2015

Related U.S. Application Data

(63) Continuation-in-part of application No. 13/756,443, filed on Jan. 31, 2013, and a continuation-in-part of application No. 13/756,467, filed on Jan. 31, 2013, and a continuation-in-part of application No. 13/756,450, filed on Jan. 31, 2013.

(51) Int. Cl.
*G06F 16/28* (2019.01)
*G06Q 10/08* (2012.01)

(52) U.S. Cl.
CPC ......... *G06F 16/285* (2019.01); *G06Q 10/087* (2013.01)

(58) Field of Classification Search
None
See application file for complete search history.

(56) References Cited

U.S. PATENT DOCUMENTS

| 6,687,705 | B2 | 2/2004 | Agrawal et al. |
| 7,533,093 | B2 | 5/2009 | Gutta et al. |
| 7,584,189 | B2 * | 9/2009 | Murakami ............... G06F 16/35 |
| 7,664,747 | B2 | 2/2010 | Petras et al. |

(Continued)

*Primary Examiner* — Mariela Reyes
*Assistant Examiner* — Edward Jacobs
(74) *Attorney, Agent, or Firm* — Bryan Cave Leighton Paisner LLP

(57) ABSTRACT

Computerized data processing and electronic file management methods of organizing and indexing electronic records in an electronic database for categorizing new products that are being added to an existing database of product offerings and computerized digital data processing methods of transferring digital information between a plurality of computers and employing computer instructions to categorize new products that are being added to an existing database of product offerings. Multiple classification models classify a description of a particular product and the classifications are compared, and if found to be equivalent, are added to the existing database of product offerings. If the classifications from the models are not equivalent, then the description is sent to multiple people for classification and the classifications from the people are compared, and if found to be equivalent, are added to the existing database of product offerings.

17 Claims, 5 Drawing Sheets

(56) References Cited

U.S. PATENT DOCUMENTS

| | | | |
|---|---|---|---|
| 7,672,877 B1* | 3/2010 | Acton | G06Q 30/0601 705/26.1 |
| 7,743,059 B2 | 6/2010 | Chan et al. | |
| 7,870,039 B1* | 1/2011 | Dom | G06Q 30/0613 705/26.41 |
| 7,873,205 B2* | 1/2011 | Okuda | G06K 9/6292 382/145 |
| 7,945,437 B2* | 5/2011 | Mount | G06F 16/35 704/4 |
| 7,949,576 B2 | 5/2011 | Lee et al. | |
| 7,966,225 B2 | 6/2011 | Chan et al. | |
| 7,974,984 B2* | 7/2011 | Reuther | G06F 16/35 707/777 |
| 8,095,521 B2 | 1/2012 | Chan et al. | |
| 8,145,662 B2* | 3/2012 | Chen | G06F 16/36 707/767 |
| 8,195,498 B2* | 6/2012 | Vojnovic | G06Q 10/06311 705/7.14 |
| 8,463,805 B2* | 6/2013 | Osborn | G06Q 30/0281 707/765 |
| 10,726,060 B1* | 7/2020 | Dutta | G06N 20/00 |
| 2002/0103789 A1* | 8/2002 | Turnbull | G06F 16/9535 |
| 2003/0097196 A1 | 5/2003 | Gutta et al. | |
| 2003/0110055 A1* | 6/2003 | Chau | G06Q 10/0875 705/29 |
| 2005/0197883 A1* | 9/2005 | Kettner | G06Q 10/087 705/7.35 |
| 2006/0095370 A1* | 5/2006 | Seth | G06F 16/285 705/40 |
| 2006/0218134 A1* | 9/2006 | Simske | G06F 16/35 |
| 2007/0022021 A1 | 1/2007 | Walker et al. | |
| 2007/0100812 A1* | 5/2007 | Simske | G06F 17/30011 |
| 2007/0214140 A1* | 9/2007 | Dom | G06F 16/353 |
| 2007/0250487 A1 | 10/2007 | Reuther | |
| 2008/0027887 A1* | 1/2008 | Barbu | G06N 20/00 706/25 |
| 2008/0183646 A1* | 7/2008 | Harris | G06K 9/6269 706/12 |
| 2008/0270169 A1 | 10/2008 | Kibar et al. | |
| 2008/0319932 A1* | 12/2008 | Yih | G06Q 10/10 706/20 |
| 2009/0012971 A1* | 1/2009 | Hunt | G06F 16/285 |
| 2009/0018932 A1* | 1/2009 | Evans | G06Q 30/02 705/301 |
| 2009/0157571 A1* | 6/2009 | Smith | G06K 9/6292 706/12 |
| 2009/0171880 A1* | 7/2009 | Wang | G06Q 30/02 706/47 |
| 2010/0169361 A1 | 7/2010 | Chen et al. | |
| 2011/0087626 A1* | 4/2011 | Yeleshwarapu | G06Q 10/087 706/12 |
| 2012/0030729 A1* | 2/2012 | Schwartz | G06Q 10/0633 726/1 |
| 2012/0072268 A1* | 3/2012 | Ritter | G06Q 10/06393 705/7.39 |
| 2012/0102040 A1* | 4/2012 | Battle | G06Q 40/00 707/741 |
| 2013/0073490 A1* | 3/2013 | Baughman | G06N 3/126 706/13 |
| 2013/0086072 A1* | 4/2013 | Peng | G06F 16/9537 707/743 |
| 2013/0110498 A1* | 5/2013 | Bekkerman | G06F 40/289 704/9 |
| 2013/0218813 A1* | 8/2013 | Rinott | G06K 9/6265 706/12 |
| 2014/0006319 A1* | 1/2014 | Anand | G06N 5/02 706/12 |
| 2014/0172767 A1* | 6/2014 | Chen | G06Q 10/0631 706/50 |
| 2014/0214607 A1* | 7/2014 | Kazai | G06Q 30/0609 705/26.35 |
| 2014/0214841 A1 | 7/2014 | Garera et al. | |
| 2014/0214844 A1 | 7/2014 | Garera et al. | |
| 2014/0214845 A1 | 7/2014 | Garera et al. | |

* cited by examiner

PRODUCT CLASSIFICATION DATA TRANSFER AND MANAGEMENT

RELATED PATENT APPLICATIONS

This patent application is a continuation-in-part of, and claims priority to, U.S. non-provisional patent application Ser. No. 13/756,443, filed Jan. 31, 2013, Semantic Product Classification; Ser. No. 13/756,450 filed Jan. 31, 2013, Multiple Classification Models in a Pipeline; and Ser. No. 13/756,467 filed Jan. 31, 2013, Product Classification into Product Type Families; all of which have at least one inventor in common with the current patent application and the same assignee. The contents of all of these priority patent applications are incorporated herein by reference. If there are any conflicts or inconsistencies between this patent application and the patent applications incorporated by reference, however, this patent application governs herein.

FIELD OF THE INVENTION

Various embodiments of this invention relate to computerized data processing and electronic file management methods and apparatuses for organizing and indexing electronic records in an electronic database and computerized digital data processing methods apparatuses for transferring digital information between a plurality of computers. Particular embodiments relate to computer implemented methods and apparatus for categorizing new products that are being added to an existing database of product offerings.

BACKGROUND OF THE INVENTION

Retailers often have databases and warehouses full of thousands upon thousands of products offered for sale, with new product items being added and offered every day. Accordingly, the databases must be updated with these new products in an organized and usable manner. Each existing product and new product item should be categorized within the database so that it can be found by customers for purchase or employees for stocking. The large number of products offered for sale by a merchant makes updating a merchant's product database human labor intensive and costly if manual labor is used in the current methods and systems. On the other hand, computer based systems can pose accuracy problems that is unacceptable in the current market place. These problems and other problems persist even with the use of computers and current computing systems. Room for improvement exists over the prior art in these and other areas that may be apparent to a person of ordinary skill in the art having studied this document.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

Figure 1:
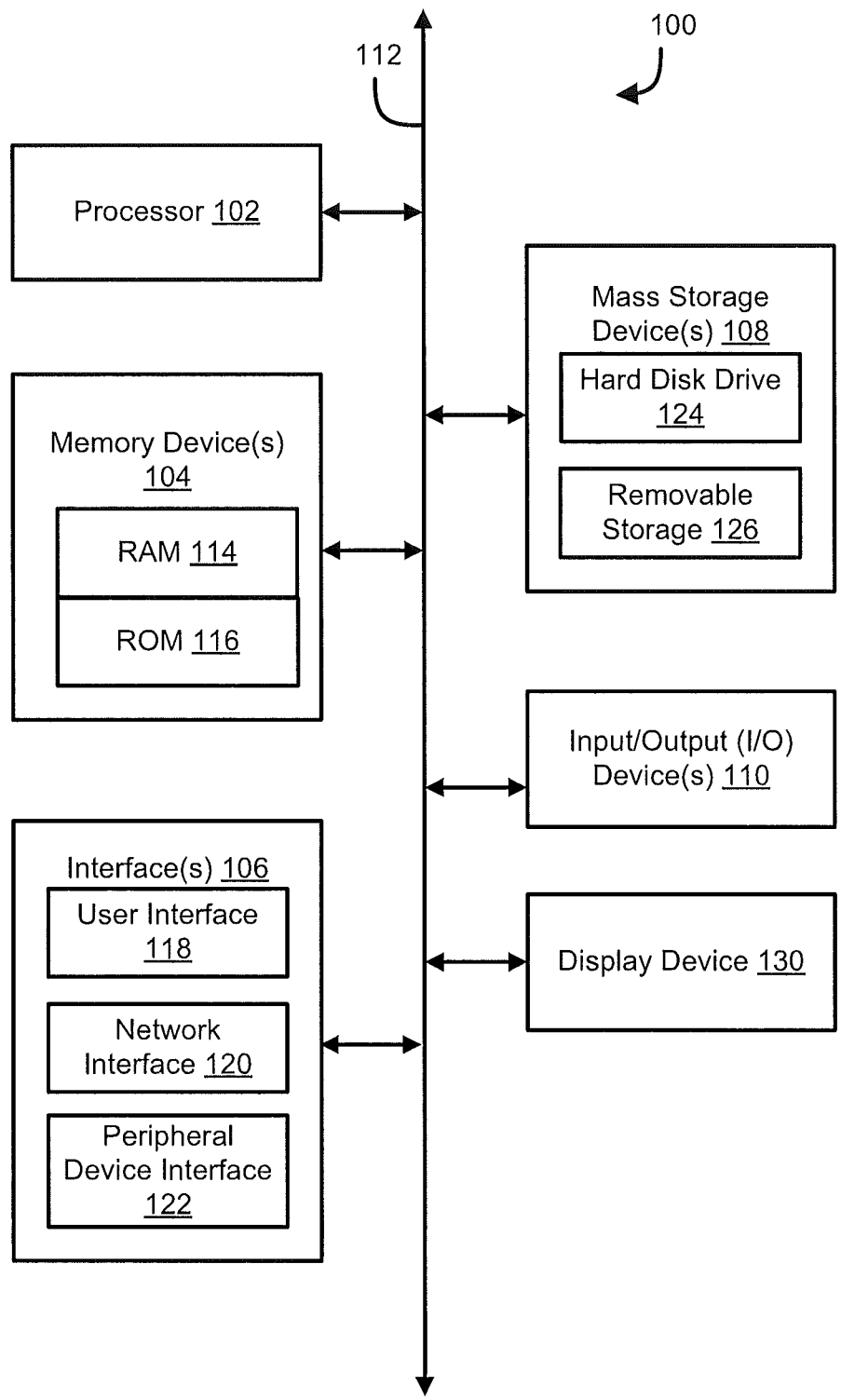
FIG. 1 illustrates an example block diagram of a computing device.

These drawings illustrate, among other things, examples of certain aspects of particular embodiments. Other embodiments may differ. Various embodiments may include aspects shown in the drawings, described in the specification, shown or described in other documents that are incorporated by reference, known in the art, or a combination thereof, as examples.

DETAILED DESCRIPTION OF EXAMPLES OF EMBODIMENTS

This patent application describes, among other things, examples of certain embodiments, and certain aspects thereof. Other embodiments may differ from the particular examples described in detail herein. Various embodiments of the disclosed methods, apparatuses, and systems herein, provide more efficient and cost effective methods, apparatuses, and systems for merchants to keep product databases up to date with new product offerings.

Various embodiments are or concern computer systems, apparatuses, and computer implemented methods for computerized data processing and electronic file management, as examples. Various embodiments include, for instance, methods of organizing and indexing electronic records in an electronic database. Further, in a number of embodiments, computerized digital data processing includes transferring digital information between a plurality of computers and employing computer instructions, for example, to categorize new products that are being added to an existing database of product offerings. Many different embodiments include categorizing new products that are being added to an existing database of product offerings.

Various embodiments include classifying a particular new product with multiple different classification models, comparing classifications from the different models, and if (e.g., at least two of) the classifications from the different models are equivalent, adding a description of the particular new product to the existing database of product offerings at that classification. Further, in a number of embodiments, if the classifications from the different models are not equivalent, the description of the particular new product is sent or transferred to multiple different people for classification, and if classifications identified by (e.g., at least two of) those people are equivalent, adding the description of the particular new product to the existing database of product offerings at that classification. In addition, various other embodiments are also described herein, and various benefits of certain embodiments may be apparent to a person of ordinary skill in the art.

The present disclosure extends to methods, systems, and computer program products for updating a merchant's database with new product items on a merchant's network. In the following description of the present disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure.

Implementations of the present disclosure may comprise or utilize a special purpose or general-purpose computer including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 may include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
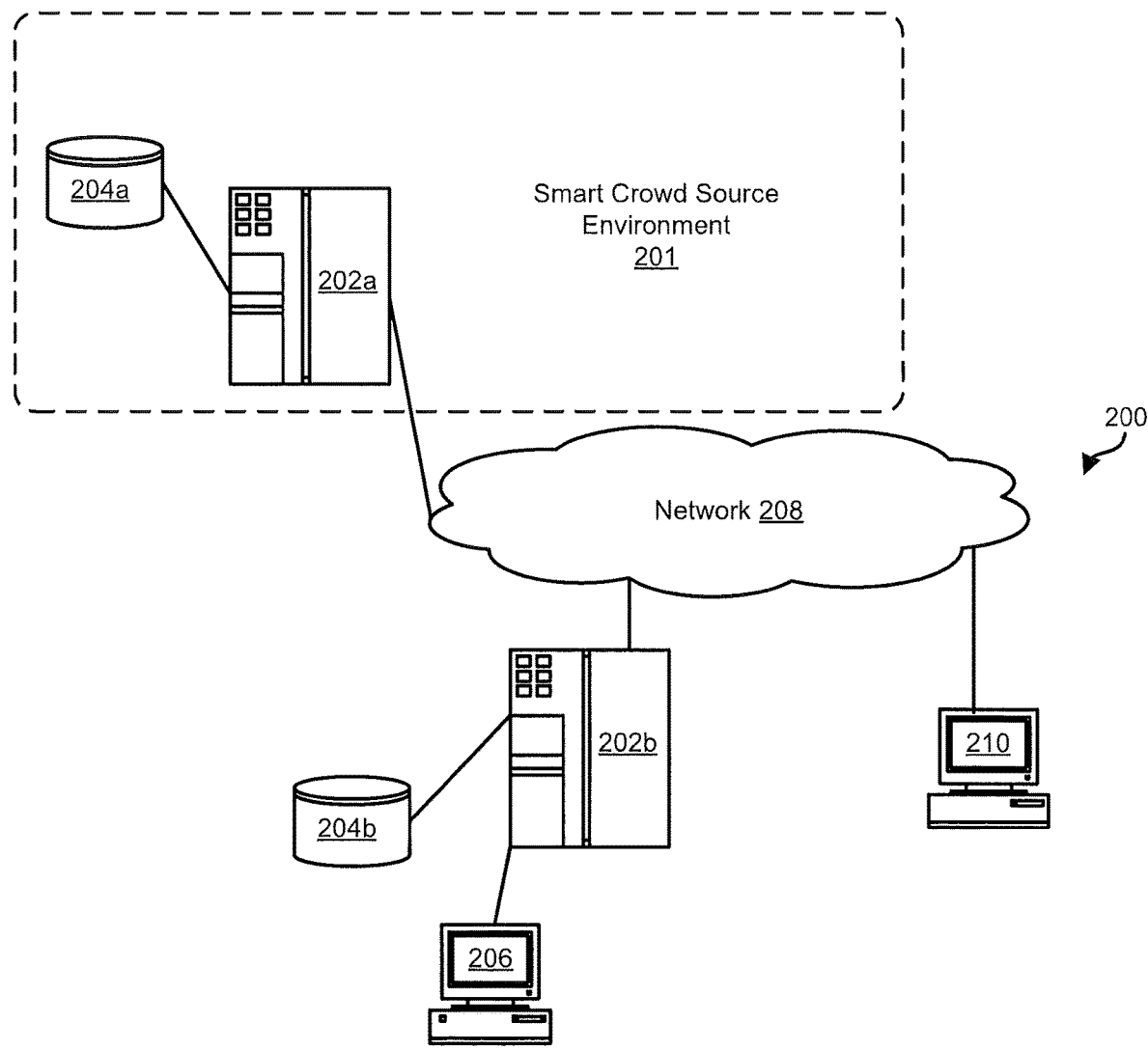
FIG. 2 illustrates an example computer architecture that facilitates different implementations described herein.

FIG. 2 illustrates an example of a computing environment 200 and a smart crowd source environment 201 suitable for implementing the methods disclosed herein. In some implementations, a server 202a provides access to a database 204a in data communication therewith, and may be located and accessed within a brick and mortar retail location. The database 204a may store customer attribute information such as a user profile as well as a list of other user profiles of friends and associates associated with the user profile. The database 204a may additionally store attributes of the user associated with the user profile. The server 202a may provide access to the database 204a to users associated with the user profiles and/or to others. For example, the server 202a may implement a web server for receiving requests for data stored in the database 204a and formatting requested information into web pages. The web server may additionally be operable to receive information and store the information in the database 204a.

As used herein a smart crowd source environment is a group of users connected over a network that may be assigned tasks to perform over the network in mass. In an implementation the smart crowd source may be in the employ of a merchant, or may be contracted with on a per task basis as may be common in the crowd source community. The work product from the smart crowd source is generally conveyed back to the system over the same network that supplied the tasks to be performed. In the implementations that follow, users or members of a smart crowd source may be tasked with reviewing the computer generated classification of new product items to insure that the automatically performed processes of the method have created a classification that is accurate, complete and relevant. In an implementation, a smart crowd source may be presented with a hierarchy of products within a merchant's database that also comprises the classification of the new product placed within the hierarchy relative to existing items in the hierarch, and accordingly check to see if the new product item is placed correctly in the hierarchy.

As used herein, a top down hierarchy is intended as a data structure may comprise successive levels and nodes that represent departments and product types in order to organize a merchant's database.

A server 202b may be associated with a merchant or by another entity or party providing merchant services. The server 202b may be in data communication with a database 204b. The database 204b may store information regarding various products. In particular, information for a product may include a name, description, categorization, reviews, comments, price, past transaction data, and the like. The server 202b may analyze this data as well as data retrieved from the database 204a in order to perform methods as described herein. An operator or customer/user may access the server 202b by means of a workstation 206, which may be embodied as any general purpose computer, tablet computer, smart phone, or the like.

The server 202a and server 202b may communicate with one another over a network 208 such as the Internet or some other local area network (LAN), wide area network (WAN), virtual private network (VPN), or other network. A user may access data and functionality provided by the servers 202a, 202b by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a-202b, and databases 204a, 204b may have some or all of the attributes of the computing device 100.

It is to be further understood that the phrase "computer system," as used herein, shall be construed broadly to include a network as defined herein, as well as a single-unit work station (such as work station 206 or other work station) whether connected directly to a network via a communications connection or disconnected from a network, as well as a group of single-unit work stations which can share data or information through non-network means such as a flash drive or any suitable non-network means for sharing data now known or later discovered.

Figure 3:
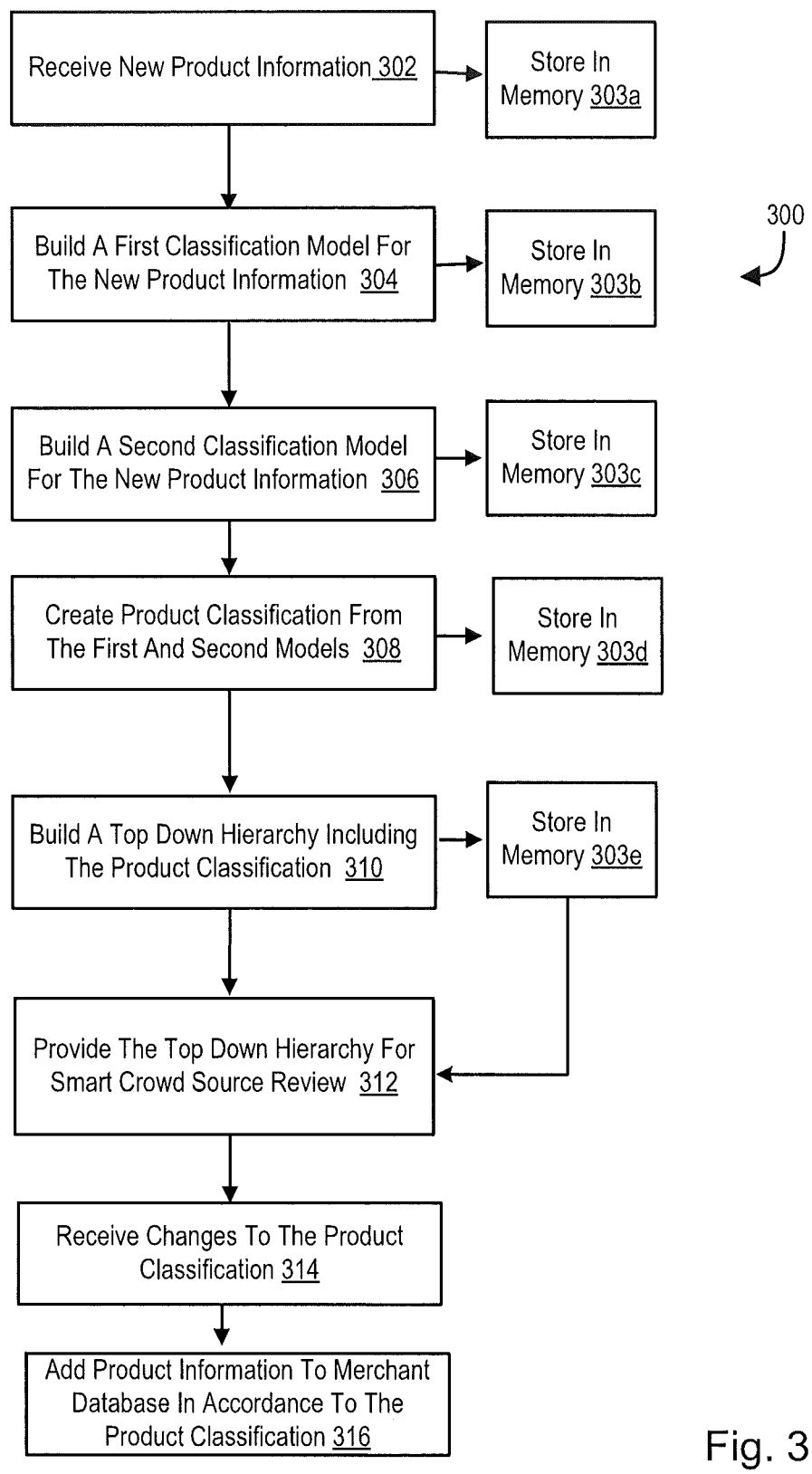
FIG. 3 is a flow chart illustrating an example method according to one implementation.

With reference primarily to FIG. 3, an implementation of a method 300 for updating a merchant's database through semantic product classification will be discussed. FIG. 1 and FIG. 2 may be referenced secondarily during the discussion in order to provide hardware support for the implementation. The disclosure aims to disclose methods and systems to allow a new product item to be automatically and efficiently added to a product database. For example, a product item may have a text based description and title associated with it that provides information that can be used and quantified for classifying the new product item within a merchant's database. In an implementation the title and description alone may be combined to form product item information that may be used to semantically analyze and classify a product item so that it can properly be categorized within a database automatically.

The method 300 may be performed on a system that may include the database storage 204a (or any suitable memory device disposed in communication with the network 208) receiving a new product item information 302 representing the new product item to be sold by a merchant. At 303a the product item information may be stored in memory located within computing environment 200. The product item information may be received in digital form from an electronic database in communication with the merchants system, or may be manually input by a user. The product item information may comprise a title, a description, parameters of use and performance, and any other suitable information associated with the product that may be of interest in a merchant environment for classifying and categorizing the product item.

At 304 the system may establish a first classification model for the new product item based on the product item information received at 302. A classification model may be used within the computing environment 200 to quantify text based values from the product information that represents properties of the new product item. The classification model may classify the new product item by performing a semantic algorithm, or series of semantic algorithms, against the properties provided in the new product item information in order to categorize the new product item relative to existing products items already in a merchant's database. Examples of classification models are: Naive Bayes, K-Nearest-Neighbors, SVM, logistic regression, and multiclass perceptron, to name just a few. It should be understood that any classification model that is known or yet to be discovered is to be considered within the scope of this disclosure. It is to be contemplated that the first classification model may comprise a single algorithm or a plurality of algorithms in order to classify the new product item with desired accuracy. At 303b, the classification model and results may be stored in memory within computing environment 200.

At 306 the system may establish a second classification model for the new product item based on the product item information received at 302. As previously discussed, a classification model may be used within the computing environment 200 to quantify properties of the new product item by performing an algorithm or series of algorithms against the properties provided in the new product item information in order to categorize the new product item relative to existing products items already in a merchant's database. Similar to the first classification model of 304, examples of possible classification models to be used for a second classification model may be: Naive Bayes, K-Nearest-Neighbors, SVM, logistic regression, and multiclass perceptron. It is to be contemplated that the second classification model may comprise a single algorithm or a plurality of algorithms as desired to classify the new product item within a desired tolerance. Additionally, the second classification model may be selected independently of the first classification model, or may be selected to complement the first classification model. At 303c, the second classification model results may be stored in memory within computing environment 200.

In an implementation the first and second classification models may be different, while in another implementation the first and second classification models may be the same. It should be noted that the classification models may be selected randomly by the system, or may be predetermined by an administrator of the system.

At 308, the results of the first classification model and second classification model may be combined to create a product classification for the new product item. In an implementation the results of the first classification model may be used complementary to the results of the second classification model in an additive manner in order to emphasize or deemphasize certain aspects of the product information. Alternatively, the results of the first and second classifications may be used in subtractive manner to emphasize or deemphasize certain aspects of the product information for the new product item classification. At 303d the new product item classification may be stored in memory within computing environment 200.

At 310, a top down hierarchy may be built comprising the new product item classification such that the new product item is placed within the top down hierarchy according to its classification relative to existing items classification also appearing in the top down hierarchy. At 303e the built top down hierarchy may be stored in memory within computing environment 200.

At 312, the top down hierarchy may be presented to a plurality of users for smart crowd source review. The smart crowd source review may be used to check the new product classification created at 308 for accuracy and relevancy. For example, a new product item may be car tires for a scale model of a popular automobile that a merchant also provides tires for. If by chance that the classification models missed markers in the new product item information that denoted the tires were for a scale model, the scale model tires may appear in the merchants data base as full size tires for an actual automobile. A smart crowd user could readily spot such an anomaly and provide corrective information.

Additionally, the smart crowd source review may be used to check the placement of the new product item in the top down hierarchy. To continue the scale model tire example discussed above, the scale model tires may be mistakenly placed within a top down hierarchy with automotive tires. A smart crowd user could readily see such a discrepancy and provide corrective action.

At 314, the smart crowd corrections are received by the system and may be added to the product classification and stored within memory of the computing environment 200. It should be noted that the smart crowd users may be connected over a network, or may be located within a brick and mortar building owned by the merchant. The smart crowd users maybe employees and representatives of the merchant, or may be outsourced to smart crowd communities.

At 316, the new product item may be added to the merchant database and properly categorized relative to existing products within the merchant database based on its classification. As can be realized from the discussion above, a merchant can efficiently and cost effectively add new product items to their inventory by practicing the method 300 which takes advantage of automatic classification processes prior to enlisting human input such that expensive human involvement may be limited to checking and correction.

Figure 4:
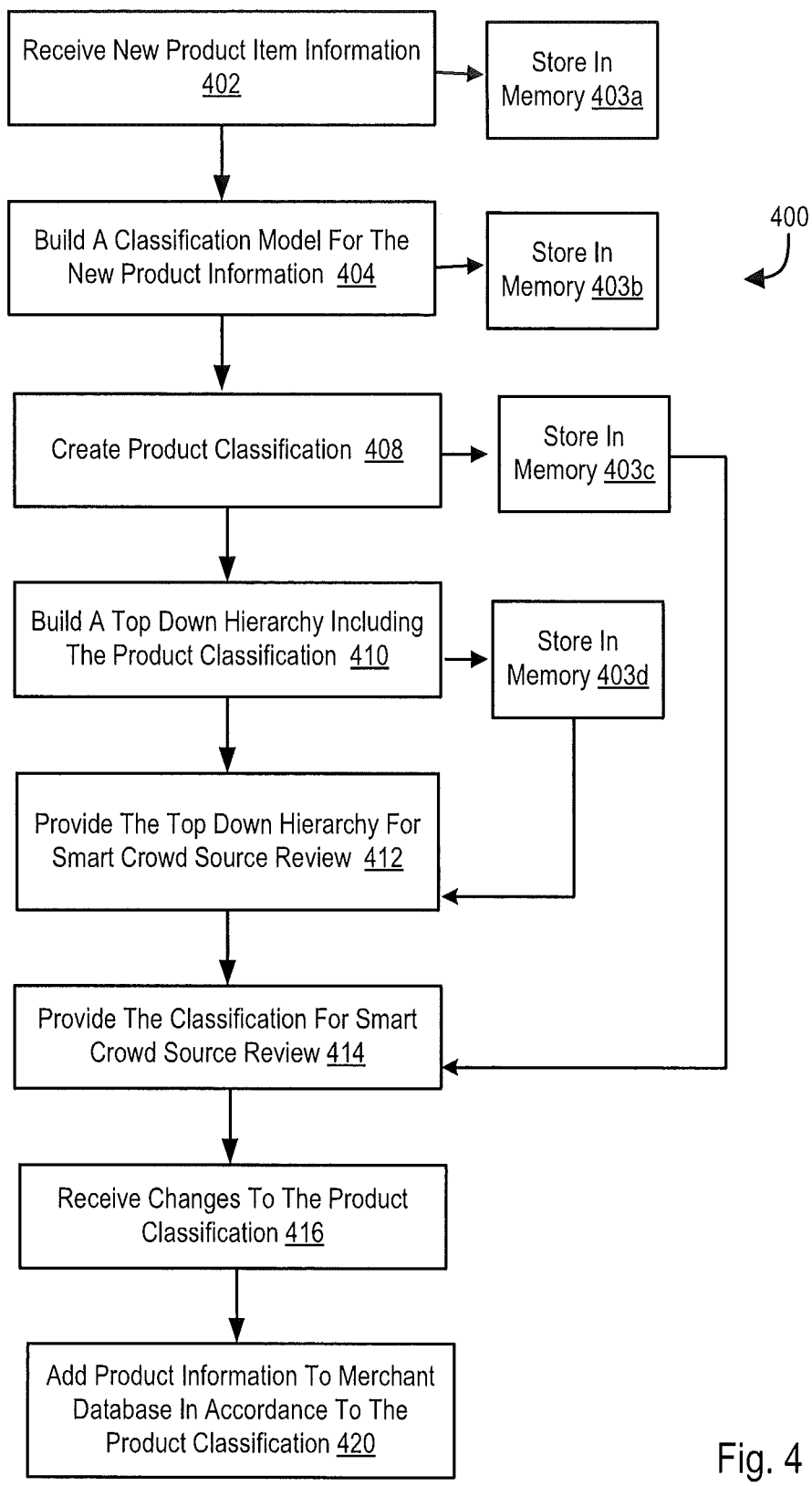
FIG. 4 is a flow chart illustrating an example method according to one implementation.

With reference primarily to FIG. 4 a method and system for adding new product items to a merchant's database wherein classification model results may be separated into a plurality of sub-parts in order to ease process of smart crowd review will be discussed. FIGS. 1 and 2 may be referenced secondarily during the discussion in order to provide hardware support for the implementation. The disclosure aims to disclose a method of adding a new product item that places a reduced burden of review on individual users within a smart crowd source environment 201.

The method 400 may be performed on a system that may include the database storage 204a (or any suitable memory device disposed in communication with the network 208) receiving a new product item information at 402 representing the new product item to be sold by a merchant. At 403a the product item information may be stored in memory located within computing environment 200. The product item information may be received in digital form from an electronic database in communication with the merchants system, or may be manually input by a user. The product item information may comprise a title, a description, parameters of use and performance, and any other suitable information associated with the product that may be of interest in a merchant environment for identifying and categorizing the new product item.

At 404 the system may establish a classification model for the new product item based on the product item information received at 402. A classification model may be used within the computing environment 200 to quantify properties of the new product item by performing an algorithm or series of algorithms against the properties provided in the new product item information in order to categorize the new product item relative to existing products items already in a merchant's database. Examples of classification models are: Naive Bayes, K-Nearest-Neighbors, SVM, logistic regression, and multiclass perceptron, and the like. It should be understood that any classification model that is known or yet to be discovered is to be considered within the scope of this disclosure. It is to be contemplated that the first classification model may comprise a single algorithm or a plurality of algorithms as desired to classify the new product item. At 403b, the classification model may be stored in memory within computing environment 200.

At 408, the results of the first classification model may be used to create a product classification for the new product item. In an implementation a plurality of classification models may be built to further refine classification of the new product item information. At 403c the new product item classification may be stored in memory within computing environment 200.

At 410, a top down hierarchy may be built comprising the new product item classification such that the new product item is placed within the top down hierarchy according to its classification relative to existing items classification also appearing in the top down hierarchy. At 403d the built top down hierarchy may be stored in memory within computing environment 200.

In an implementation the classification results from the classification models and the top down hierarchy may be presented to different smart crowd source users in order to reduce the complexity of the review for each individual user, thereby reducing the skill level needed by the members/users within the smart crowd source. Accordingly, at 412, the top down hierarchy may be presented to a plurality of first users for a first smart crowd source review such that the first smart crowd source review may be performed to check the placement of the new product item in the top down hierarchy as built at 410. For example, and to continue the scale model tire example discussed above, the scale model tires may have been mistakenly placed within a top down hierarchy with automotive tires. A first smart crowd user could readily see that the scale model tires do not belong with actual automotive tires within the top down hierarchy and could easily provide corrective data over the network.

At 414, the classification created at 308 may be presented to second smart crowd source users for a review that may be performed to check the new product classification created at 408 for accuracy and relevancy. For example, a new product item may be car tires for a scale model of a popular automobile that a merchant that also provides tires for actual automobiles. If the classification models missed markers in the new product item information that denoted the tires were for a scale model, the scale model tires may appear in the merchant's data base as full size tires for an actual automobile. A second smart crowd user could readily spot such an anomaly in the classification and provide corrective information.

In an implementation, a top down hierarchy may comprise successive levels and nodes that represent departments and product types in order to organize a merchant's database. Accordingly, the method may further comprise the process of presenting portions of the top down hierarchy to smart crowd source members that have been divided by levels and nodes, thereby allowing specialized smart crowd source review. In an implementation levels may represent departments within a merchant's database and nodes may represent product types. In other words, discrete portions of the top down hierarchy can be presented to those individuals in the smart crowd source that are specialized in the pertinent product type.

At 416, the smart crowd corrections are received by the system and may be added to the product classification and stored within memory of the computing environment 200. It should be noted that the smart crowd users may be connected over a network, or may be located within a brick and mortar building owned by the merchant. The smart crowd users maybe employees and representatives of the merchant, or may be outsourced to smart crowd communities.

At 420, the new product item may be added to the merchant database properly categorized relative to existing products within the merchant database based on its classification. As can be realized from the discussion above, a merchant can efficiently and cost effectively add new product items to their inventory by practicing the method 400 which takes advantage of automatic classification processes and then is able to most effectively use expensive human involvement by dividing needed review into limited portions requiring less skill to review.

Figure 5:
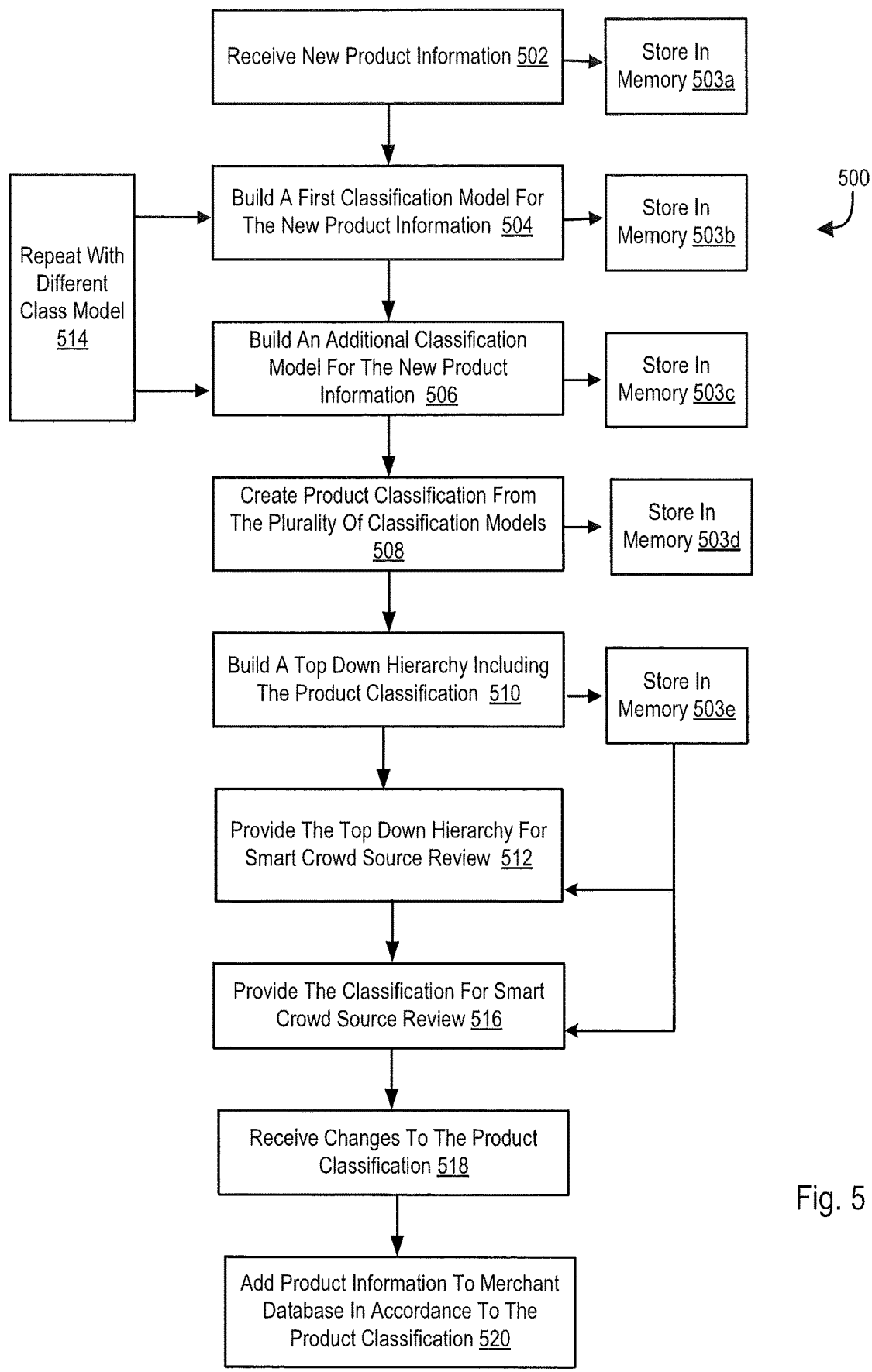
FIG. 5 is a flow chart illustrating an example method according to one implementation.

With reference primarily to FIG. 5, an implementation of a method 500 for updating a merchant's database using a plurality of classification models will be discussed. FIG. 1 and FIG. 2 may be referenced secondarily during the discussion in order to provide hardware support for the implementation. The disclosure aims to disclose methods and systems to allow a product to be automatically and efficiently added to a product database. For example, a product item may have a description and title associated with it that is desirable to be categorized within a merchant's database. In an implementation the title and description may combine to be product item information that may be used analyze and classify a product item so that it can properly be categorized within a database.

The method 500 may be performed on a system that may include the database storage 204a (or any suitable memory device disposed in communication with the network 208) receiving a new product item information 502 representing the new product item to be sold by a merchant. At 503a the product item information may be stored in memory located within computing environment 200. The product item information may be received in digital form from an electronic database in communication with the merchants system, or may be manually input by a user. The product item information may comprise a title, a description, parameters of use and performance, and any other suitable information associated with the product that may be of interest in a merchant environment for identifying and categorizing the product item.

At 504 the system may establish a first classification model for the new product item based on the product item information received at 502. A classification model may be used within the computing environment 200 to quantify properties of the new product item by performing an algorithm or series of algorithms against the semantic properties provided in the new product item information in order to categorize the new product item relative to existing products items already in a merchant's database. Examples of classification models are: Naive Bayes, K-Nearest-Neighbors, SVM, logistic regression, and multiclass perceptron, and the like. It should be understood that any classification model that is known or yet to be discovered is to be considered within the scope of this disclosure. It is to be contemplated that the first classification model may comprise a single algorithm or a plurality of algorithms as desired to classify the new product item. At 503b, the classification model may be stored in memory within computing environment 200.

At 506 the system may establish an additional classification model for the new product item based on the product item information received at 502. A classification model may be used within the computing environment 200 to quantify the semantic properties of the new product item by performing an algorithm or series of algorithms against the properties provided in the new product item information in order to categorize the new product item relative to existing products items already in a merchant's database. Similar to the first classification model of 504, examples of possible classification models to be used in successive iterations may be: Naive Bayes, K-Nearest-Neighbors, SVM, logistic regression, and multiclass perceptron, and the like. It is to be contemplated that the successive classification models may comprise a single algorithm or a plurality of algorithms as desired to classify the new product item with ever increasing degrees of accuracy before being reviews by smart crowd sourcing as discussed below. At 503b, the classification model may be stored in memory within computing environment 200.

At 514, additional classification models may be used to provide increased accuracy to insure greater efficiency in classifying new product items. The successive classification models may be selected independently of the classification models that precede it. In an implementation, a successive classification model may be selected to complement the first classification model or any of the preceding classification models. At 503c, the results of the successive classification models may be stored in memory within computing environment 200.

In an implementation, each iteration of classification model may be different, while in another implementation successive classification models may repeat or may be repeated in a predetermined pattern. It should be noted that the classification models may be selected randomly by the system, or may be predetermined by an administrator of the system.

At 508, the results of the first classification model and any successive classification models may be combined to create a product classification for the new product item. At 503d the new product item classification may be stored in memory within computing environment 200.

At 510, a top down hierarchy may be built comprising the new product item classification such that the new product item is placed within the top down hierarchy according to its classification relative to existing items classification also appearing in the top down hierarchy. At 503e the built top down hierarchy may be stored in memory within computing environment 200.

At 516, the top down hierarchy may be presented to a plurality of users for smart crowd source review. The smart crowd source review may be used to check the new product classification created at 508 for accuracy and relevancy. Additionally, the smart crowd source review may be used to check the placement of the new product item in the top down hierarchy.

At 518, the smart crowd corrections are received by the system and may be added to the product classification and stored within memory of the computing environment 200. It should be noted that the smart crowd users may be connected over a network, or may be located within a brick and mortar building owned by the merchant. The smart crowd users maybe employees and representatives of the merchant, or may be outsourced to smart crowd communities.

At 520, the new product item may be added to the merchant database and properly categorized relative to existing products within the merchant database based on its classification. As can be realized from the discussion above, a merchant can efficiently and cost effectively add new product items to their inventory by practicing the method 500 which takes advantage of a plurality of automatic classification processes before using expensive human involvement for checking the accuracy of the machine classification.

Various embodiments include or employ a computerized data processing and electronic file management method of organizing and indexing electronic records in an electronic database, for example, for categorizing new products that are being added to an existing database of product offerings (e.g., 204b in FIG. 2). In a number of embodiments, for example, a method includes classifying (e.g., 308, 408, or 508 in FIGS. 3, 4, and 5) a particular product of the new products, for instance, with at least one processor (e.g., 102 in FIG. 1), using Naïve Bayes to produce a first classification of the particular product, classifying (e.g., 308, 408, or 508) the particular product, for example, with the at least one processor (e.g., 102), using K-Nearest-Neighbors to produce a second classification of the particular product, and classifying (e.g., 308, 408, or 508) the particular product, for example, with the at least one processor (e.g., 102), using Multiclass Perceptron to produce a third classification of the particular product. This order of these acts is an example of an order in which these classification models can be performed, but in different embodiments, various classification models can be implemented in a different order or at the same time. As used herein, unless stated otherwise, or necessarily otherwise from the logic of the acts, where a method is described herein, the acts can be performed in any order, although the order provided is an example of a specific order in which the acts can be performed.

Further, a number of embodiments include evaluating, for example, with the at least one processor (e.g., 102), whether two of the first classification, the second classification and the third classification are equivalent. Still further, in some embodiments, when two of the first classification, the second classification and the third classification are equivalent, certain embodiments include adding (e.g., 316, 420, or 520), for example, with the at least one processor (e.g., 102), the description of the particular product to the existing database of product offerings (e.g., 204b), for instance, at the two of the first classification, the second classification and the third classification that are equivalent. Even further, in various embodiments, when two of the first classification, the second classification, and the third classification are not equivalent, the method includes sending, for example, with the at least one processor (e.g., 102), for instance, through at least one computer network (e.g., 208), the description of the particular product to (e.g., at least three) different people for classification. In some embodiments, a different number of people may be used, for example, 2, 4, 5, 6, 7, 8, 9, 10, 11, or 12 people, as examples.

Moreover, a number of embodiments include receiving or accessing, for example, with the at least one processor (e.g., 102 in FIG. 1, for instance, from at least two of the at least three different people), at least a fourth classification and a fifth classification of the particular product. Further still, in some embodiments, when the fourth classification and the fifth classification are equivalent, the method includes adding (e.g., 316, 420, or 520, for instance, received in act 314, 416, or 518), for example, with the at least one processor (e.g., 102), the description of the particular product to the existing database of product offerings (e.g., 204b) at the fourth classification. Even further still, in particular embodiments more than two (e.g., 3, 4, or 5) agreeing classifications must be received from different people to add the description of the particular product to the existing database of product offerings (e.g., 204b) at that agreeing classification. Furthermore, various embodiments include repeating the method for (e.g., each of) the new products. As used herein, when a method identifying a particular product of various new products is repeated, in each repetition of the method, a different one of the new products is the "particular product". Further, as used herein, when an act in a method is described as taking place "when" a certain situation exits, that act occurs in an iteration of the method when that certain situation exists, but that act does not necessarily occur in an iteration of the method when that certain situation does not exist.

A number of embodiments include or employ a computerized digital data processing method, for example, of transferring digital information between a plurality of computers and employing computer instructions to categorize new products that are being added to an existing database of product offerings (e.g., 204b). In various embodiments, for example, a method includes acts of receiving, for example, with a first at least one processor (e.g., 102), for instance, from a second at least one processor (e.g., 102), through a computer network (e.g., 208), a description of a particular product of the new products. In a number of embodiments, for example, the first at least one processor (e.g., 102) and the second at least one processor (e.g., 102) are spatially distributed. As used herein, "spatially distributed" means at least 1 mile apart. For example, in this embodiment, the first at least one processor (e.g., 102) and the second at least one processor (e.g., 102) are at least one mile apart. In various embodiments, processors or computers transferring digital information over a computer network (e.g., 208) may be much farther apart.

Further, a number of embodiments include establishing a classification of the particular product, for example, with the first at least one processor (e.g., 102) using a first classification model and using the description of the particular product to produce a first classification of the particular product. Still further, many embodiments include establishing a classification of the particular product, for instance, with the first at least one processor (e.g., 102), using a second classification model and using the description of the particular product to produce a second classification of the particular product. In a number of embodiments, the second classification model is different than the first classification model. Even further, various embodiments include establishing a classification of the particular product, for example, with the first at least one processor (e.g., 102), using a third classification model and using the description of the particular product to produce a third classification of the particular product. Further still, in a number of embodiments, the third classification model is different than the first classification model, the third classification model is different than the second classification model, or both.

Still further, many embodiments include evaluating, for instance, with the first at least one processor (e.g., 102), whether two of the first classification of the particular product, the second classification of the particular product, and the third classification of the particular product are equivalent. As used herein, "equivalent" includes identical, but is not necessarily limited to identical classifications. For example, in some embodiments, two classifications are considered to be "equivalent" if the two classifications are within a certain threshold of each other. As used herein, unless stated otherwise, two classifications are considered to be equivalent if those two classifications are near each other in the range of classifications to within one percent of the entire scope of classifications. In other embodiments, however, (e.g., where "equivalent" is stated herein) the two classifications may be near each other in the range of classifications to within $\frac{1}{10}$, $\frac{1}{4}$, $\frac{1}{2}$, 2, 3, 4, 5, 7, 10, 15, or 20 percent of the entire scope of classifications, as other examples. Even further, a number of embodiments include adding (e.g., 316, 420, or 520 in FIGS. 3, 4, and 5), for example, with the first at least one processor (e.g., 102), the description of the particular product to the existing database of product offerings (e.g., 204b) when the two of the first classification of the particular product, the second classification of the particular product, and the third classification of the particular product are equivalent.

Further still, various embodiments include transferring, for instance, through the computer network (e.g., 208 in FIG. 2), for example, from the first at least one processor (e.g., 102), the description of the particular product to a first person for classification when the first classification of the particular product, the second classification of the particular product, and the third classification of the particular product are all not equivalent. Even further still, a number of embodiments include transferring, for example, through the computer network (e.g., 208), for instance, from the first at least one processor (e.g., 102), the description of the particular product to a second person for classification when the first classification of the particular product, the second classification of the particular product, and the third classification of the particular product are all not equivalent. In various embodiments, these transferring acts are or include crowd sourcing, for instance, and in a number of embodiments, the description of the particular product is transferred to various numbers of people, such as 2, 3, 4, 5, 6, 7, 8, 9, 10, 11, 12, or 15, as examples.

Moreover, various embodiments include, for example, receiving, for example, through the computer network (e.g., 208), for instance, at the first at least one processor (e.g., 102), from the first person, a fourth classification of the particular product, receiving, for example, through the computer network (e.g., 208), for instance, at the first at least one processor (e.g., 102), from the second person, a fifth classification of the particular product, or both. In a number of embodiments, a classification may be received from each person that the description of the particular product is sent or transferred to, but in some cases, not all of the people may respond. In some embodiments, the description of the particular product is sent or transferred to more people than classifications are desired to allow for lack of response from some of the people. Further, in some embodiments, the description of the particular product may be transferred to more people if an insufficient number of people respond within a certain amount of time.

A number of embodiments include evaluating, for example, with the first at least one processor (e.g., 102), whether the fourth classification of the particular product and the fifth classification of the particular product are equivalent. Further some embodiments include evaluating whether other classifications of the particular product (e.g., received from other people to whom the description of the particular product has been transferred), are equivalent. Still further, various embodiments include adding (e.g., 316, 420, or 520, for instance, received in act 314, 416, or 518), for instance, with the first at least one processor (e.g., 102), the description of the particular product to the existing database of product offerings (e.g., 204b), for example, at the fourth classification of the particular product, when the fourth classification of the particular product and the fifth classification of the particular product are equivalent. In a number of embodiments, the description of the particular product is added to the existing database of product offerings (e.g., 204b) at a classification where a certain number of classifications agree or are equivalent. In different embodiments, this certain number can be, as examples, 2, 3, 4, or 5, for instance. Evan further, a number of embodiments include repeating the method (e.g., classifying with multiple classification models, comparing the classifications, if the classification models do not produce equivalent results sending the description of the product to multiple people, and comparing the classifications from different people, and adding (e.g., 316, 420, or 520) the classifications to the existing database when sufficient classifications are equivalent) for each of the new products.

In some embodiments, the act of adding (e.g., 316, 420, or 520), for example, with the first at least one processor (e.g., 102), the description of the particular product to the existing database of product offerings (e.g., 204b) when two of the first classification of the particular product, the second classification of the particular product, and the third classification of the particular product are equivalent includes adding (e.g., 316, 420, or 520) the description of the particular product to the existing database of product offerings (e.g., 204b) at (e.g., at least one of) the first classification, the second classification, or the third classification of the particular product. Certain embodiments, include, for example, adding (e.g., with the first at least one processor (e.g., 102)) the description of the particular product to the existing database of product offerings (e.g., 204b) at the first classification of the particular product when the first classification of the particular product and the second classification of the particular product are equivalent (e.g., in act 316, 420, or 520). Further, particular embodiments include adding (e.g., with the first at least one processor (e.g., 102)), the description of the particular product to the existing database of product offerings (e.g., 204b) at the first classification of the particular product when the first classification of the particular product and the third classification of the particular product are equivalent. Still further, some embodiments include adding (e.g., with the first at least one processor (e.g., 102)), the description of the particular product to the existing database of product offerings (e.g., 204b) at the second classification of the particular product when the second classification of the particular product and the third classification of the particular product are equivalent (e.g., in act 316, 420, or 520).

Further, as mentioned, in some embodiments, more than two people are used for classification. In some embodiments, for example, the method includes transferring (e.g., with the first at least one processor (e.g., 102), for instance, through the computer network (e.g., 208)), the description of the particular product to a third person for classification when the first classification of the particular product, the second classification of the particular product, and the third classification of the particular product are all not equivalent. Still further, some embodiments include receiving (e.g., with the first at least one processor (e.g., 102)), from the third person, a sixth classification of the particular product. Even further, certain embodiments include evaluating (e.g., with the first at least one processor (e.g., 102)), whether the fourth classification of the particular product and the sixth classification of the particular product are equivalent, evaluating (e.g., with the first at least one processor (e.g., 102)), whether the fifth classification of the particular product and the sixth classification of the particular product are equivalent, or both. Further still, some embodiments include adding (e.g., 316, 420, or 520, for instance, received in act 314, 416, or 518) (e.g., with the first at least one processor (e.g., 102)), the description of the particular product to the existing database of product offerings (e.g., 204b) at the fourth classification of the particular product when the fourth classification of the particular product and the sixth classification of the particular product are equivalent, adding (e.g., 316, 420, or 520, e.g., with the first at least one processor, for instance, 102), the description of the particular product to the existing database of product offerings (e.g., 204b) at the fifth classification of the particular product when the fifth classification of the particular product and the sixth classification of the particular product are equivalent, or both (e.g., depending on which classifications are equivalent).

In certain embodiments, the act of evaluating (e.g., with the first at least one processor (e.g., 102 shown in FIG. 1)), whether two of the first classification of the particular product, the second classification of the particular product, and the third classification of the particular product are equivalent includes evaluating (e.g., with the first at least one processor (e.g., 102)), whether the first classification of the particular product and the second classification of the particular product are equivalent. Further, in some embodiments, at least when the first classification of the particular product and the second classification of the particular product are not equivalent, the method includes an act of evaluating (e.g., with the first at least one processor (e.g., 102)), whether the first classification of the particular product and the third classification of the particular product are equivalent. Still further, in particular embodiments, at least when the first classification of the particular product and the second classification of the particular product are not equivalent and the first classification of the particular product and the third classification of the particular product are not equivalent, the method includes evaluating (e.g., with the first at least one processor (e.g., 102)), whether the second classification of the particular product and the third classification of the particular product are equivalent.

In various such embodiments, one of the first classification model, the second classification model, and the third classification model is Naïve Bayes, one of the first classification model, the second classification model, and the third classification model is K-Nearest-Neighbors, one of the first classification model, the second classification model, and the third classification model is Multiclass Perceptron, or a combination thereof. All different combinations are different embodiments. Further, in some embodiments, classifications made by people are compared with classifications made by an automated classification mode. For example, in some embodiments, the method includes an act of evaluating (e.g., with the first at least one processor (e.g., 102)), whether the fourth classification of the particular product and the first classification of the particular product are equivalent. Still further, different embodiments include acts of evaluating (e.g., with the first at least one processor (e.g., 102)): whether the fourth classification of the particular product and the second classification of the particular product are equivalent, whether the fourth classification of the particular product and the third classification of the particular product are equivalent, whether the fifth classification of the particular product and the first classification of the particular product are equivalent, whether the fifth classification of the particular product and the second classification of the particular product are equivalent, whether the fifth classification of the particular product and the third classification of the particular product are equivalent, or a combination thereof. Even further, various embodiments include, for instance, an act of adding (e.g., with the first at least one processor (e.g., 102)), the description of the particular product to the existing database of product offerings (e.g., 204b shown in FIG. 2) at one of the classifications that is equivalent to another classification (e.g., in act 316, 420, or 520). For example, some embodiments, include an act of adding (e.g., 316, 420, or 520) the description of the particular product to the existing database of product offerings (e.g., 204b) at the first classification of the particular product when the first classification of the particular product and the fourth classification of the particular product are equivalent.

Many embodiments include a computerized method of categorizing new products that are being added to an existing database of product offerings (e.g., 204b). In various embodiments, the method includes receiving, (e.g., with at least one processor (e.g., 102)), a description of a particular product, classifying (e.g., 308, 408, or 508) the particular product for example, with the at least one processor (e.g., 102), using a first classification model and using the description of the particular product to produce a first classification of the particular product, and classifying (e.g., 308, 408, or 508) the particular product for example, with the at least one processor (e.g., 102), using a second classification model and using the description of the particular product to produce a second classification of the particular product. Further, in a number of embodiments, the second classification model is different than the first classification model. Still further, many embodiments include evaluating, for example, with the at least one processor (e.g., 102), whether the first classification of the particular product and the second classification of the particular product are equivalent. Even further, various embodiments include adding (e.g., 316, 420, or 520), for example, with the at least one processor (e.g., 102), the description of the particular product to the existing database of product offerings (e.g., 204b) at the first classification of the particular product when the first classification of the particular product and the second classification of the particular product are equivalent. Further still, a number of embodiments include sending, for example, with the at least one processor (e.g., 102), the description of the particular product to a first person for classification when the first classification of the particular product and the second classification of the particular product are not equivalent to produce a third classification of the particular product. Even further still, various embodiments include sending, for example, with the at least one processor (e.g., 102), the description of the particular product to a second person for classification when the first classification of the particular product and the second classification of the particular product are not equivalent to produce a fourth classification of the particular product. Moreover, in a number of embodiments, the second person is different than the first person. Furthermore, various embodiments include evaluating, for example, with the at least one processor (e.g., 102), whether the third classification of the particular product and the fourth classification of the particular product are equivalent, and adding (e.g., 316, 420, or 520, for instance, received in act 314, 416, or 518, shown in FIGS. 3, 4, and 5), for example, with the at least one processor (e.g., 102), the description of the particular product to the existing database of product offerings (e.g., 204b) at the third classification of the particular product when the third classification of the particular product and the fourth classification of the particular product are equivalent.

Additionally, in certain embodiments, one or both of the first classification model and the second classification model are selected from the group consisting of Naïve Bayes, K-Nearest-Neighbors, and Multiclass Perceptron. Further, particular embodiments include an act of evaluating, for example, with the at least one processor (e.g., 102 shown in FIG. 1), whether the fourth classification of the particular product and the first classification of the particular product are equivalent. Still further, the foregoing description has been presented for the purposes of illustration and description. It is not intended to be exhaustive or to limit the disclosure to the precise form disclosed. Many modifications and variations are possible in light of the above teaching. Even further, it should be noted that any or all of the aforementioned alternate implementations may be used in any combination desired to form additional hybrid implementations of the disclosure.

Further still, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents. Still further, the subject matter described herein also includes various means for accomplishing the various functions or acts described herein or apparent from the structure and acts described, or where appropriate, as a step for accomplishing that function. Further still, as used herein, the word "or", except where indicated otherwise, does not imply that the alternatives listed are mutually exclusive. Even further, where alternatives are listed herein, it should be understood that in some embodiments, fewer alternatives may be available, or in particular embodiments, just one alternative may be available, as examples.

What is claimed is:

1. A computerized data processing and electronic file management method of organizing and indexing electronic records in an electronic database for categorizing new products that are being added to an existing database of product offerings, the method comprising:

classifying a particular product of the new products with at least one processor using Naïve Bayes to produce a first classification of the particular product;

classifying the particular product with the at least one processor using K-Nearest-Neighbors to produce a second classification of the particular product;

classifying the particular product with the at least one processor using Multiclass Perceptron to produce a third classification of the particular product;

evaluating, with the at least one processor, whether at least two of the first classification, the second classification or the third classification are not identical but near each other in a top-down hierarchy within a predetermined equivalence threshold, the predetermined equivalence threshold being one percent of an entire scope of classifications within the top-down hierarchy;

when the at least two of the first classification, the second classification or the third classification are not identical but near each other in the top-down hierarchy within the predetermined equivalence threshold, adding, with the at least one processor, a description of the particular product to the existing database of product offerings at each of the at least two of the first classification, the second classification or the third classification that are not identical but near each other in the top-down hierarchy within the predetermined equivalence threshold, the existing database of product offerings comprising the top-down hierarchy comprising a root level at a top of the top-down hierarchy, a product level at a bottom of the top-down hierarchy, and a product type level located between the root level and the product level;

when the first classification, the second classification, and the third classification are all not identical and all not near each other in the top-down hierarchy within the predetermined equivalence threshold:

sending, with the at least one processor, through at least one computer network, the description of the particular product and at least a portion of the top-down hierarchy to at least three different people for classification to be performed by each of the at least three different people based on the description of the particular product;

accessing, with the at least one processor, from at least two of the at least three different people, at least a fourth classification and a fifth classification of the particular product; and when the fourth classification and the fifth classification are identical or near each other in the top-down hierarchy within the predetermined equivalence threshold, adding, with the at least one processor, the description of the particular product to the existing database of product offerings at the fourth classification; and repeating the method for each of the new products.

2. A computerized digital data processing method of transferring digital information between a plurality of computers and employing computer instructions to categorize new products that are being added to an existing database of product offerings, the method comprising:

receiving, with a first at least one processor, from a second at least one processor, through a computer network, a description of a particular product of the new products, wherein the first at least one processor and the second at least one processor are spatially distributed;

establishing a classification of the particular product with the first at least one processor using a first classification model and using the description of the particular product to produce a first classification of the particular product;

establishing a classification of the particular product with the first at least one processor using a second classification model and using the description of the particular product to produce a second classification of the particular product, wherein the second classification model is different than the first classification model;

establishing a classification of the particular product with the first at least one processor using a third classification model and using the description of the particular product to produce a third classification of the particular product, wherein the third classification model is different than the first classification model and the third classification model is different than the second classification model;

evaluating, with the first at least one processor, whether at least two of the first classification of the particular product, the second classification of the particular product, or the third classification of the particular product are not identical but near each other in a top-down hierarchy within a predetermined equivalence threshold, the predetermined equivalence threshold being one percent of an entire scope of classifications within the top-down hierarchy;

when the at least two of the first classification of the particular product, the second classification of the particular product, or the third classification of the particular product are not identical but near each other in the top-down hierarchy within the predetermined equivalence threshold, adding, with the first at least one processor, the description of the particular product to the existing database of product offerings at each of the at least two of the first classification of the particular product, the second classification of the particular product, or the third classification of the particular product that are not identical but near each other in the top-down hierarchy within the predetermined equivalence threshold, the existing database of product offerings comprising the top-down hierarchy comprising a root level at a top of the top-down hierarchy, a product level at a bottom of the top-down hierarchy, and a product type level located between the root level and the product level;

when the first classification of the particular product, the second classification of the particular product, and the third classification of the particular product are all not identical and all not near each other in the top-down hierarchy within the predetermined equivalence threshold:

transferring, through the computer network, from the first at least one processor, the description of the particular product and at least a portion of the top-down hierarchy to a first person for classification to be performed by the first person based on the description of the particular product;

receiving, through the computer network, at the first at least one processor, from the first person, a fourth classification of the particular product;

transferring, through the computer network, from the first at least one processor, the description of the particular product and at least a portion of the top-down hierarchy to a second person for classification to be performed by the second person based on the description of the particular product;

receiving, through the computer network, at the first at least one processor, from the second person, a fifth classification of the particular product;

evaluating, with the first at least one processor, whether the fourth classification of the particular product and the fifth classification of the particular product are near each other in the top-down hierarchy within the predetermined equivalence threshold; and adding, with the first at least one processor, the description of the particular product to the existing database of product offerings at the fourth classification of the particular product when the fourth classification of the particular product and the fifth classification of the particular product are identical or near each other in the top-down hierarchy within the predetermined equivalence threshold; and repeating the method for each of the new products.

3. The method of claim 2 wherein adding, with the first at least one processor, the description of the particular product to the existing database of product offerings at each of the at least two of the first classification of the particular product, the second classification of the particular product, or the third classification of the particular product comprises:

adding, with the first at least one processor, the description of the particular product to the existing database of product offerings at the first classification of the particular product, the second classification of the particular product, and the third classification of the particular product when the first classification of the particular product the second classification of the particular product, and the third classification of the particular product are all not identical but all near each other in the top-down hierarchy within the predetermined equivalence threshold.

4. The method of claim 3 further comprising:

transferring, with the first at least one processor, through the computer network, the description of the particular product and at least a portion of the top-down hierarchy to a third person for classification to be performed by the third person based on the description of the particular product when the first classification of the particular product, the second classification of the particular product, and the third classification of the particular product are all not identical and all not near each other in the top-down hierarchy within the predetermined equivalence threshold;

receiving, with the first at least one processor, from the third person, a sixth classification of the particular product;

evaluating, with the first at least one processor, whether the fourth classification of the particular product and the sixth classification of the particular product are identical or near each other in the top-down hierarchy within the predetermined equivalence threshold;

evaluating, with the first at least one processor, whether the fifth classification of the particular product and the sixth classification of the particular product are identical or near each other in the top-down hierarchy within the predetermined equivalence threshold;

adding, with the first at least one processor, the description of the particular product to the existing database of product offerings at the fourth classification of the particular product when the fourth classification of the particular product and the sixth classification of the particular product are identical or near each other in the top-down hierarchy within the predetermined equivalence threshold; and adding, with the first at least one processor, the description of the particular product to the existing database of product offerings at the fifth classification of the particular product when the fifth classification of the particular product and the sixth classification of the particular product are identical or near each other in the top-down hierarchy within the predetermined equivalence threshold.

5. The method of claim 2 wherein evaluating, with the first at least one processor, whether the at least two of the first classification of the particular product, the second classification of the particular product, or the third classification of the particular product are not identical but near each other in the top-down hierarchy within the predetermined equivalence threshold comprises:

evaluating, with the first at least one processor, whether the first classification of the particular product and the second classification of the particular product are not identical but near each other in the top-down hierarchy within the predetermined equivalence threshold;

at least when the first classification of the particular product and the second classification of the particular product are not identical and not near each other in the top-down hierarchy within the predetermined equivalence threshold, evaluating, with the first at least one processor, whether the first classification of the particular product and the third classification of the particular product are not identical but near each other in the top-down hierarchy within the predetermined equivalence threshold; and at least when the first classification of the particular product and the second classification of the particular product are not identical and not near each other in the top-down hierarchy within the predetermined equivalence threshold and the first classification of the particular product and the third classification of the particular product are not identical and not near each other in the top-down hierarchy within the predetermined equivalence threshold, evaluating, with the first at least one processor, whether the second classification of the particular product and the third classification of the particular product are not identical but near each other in the top-down hierarchy within the predetermined equivalence threshold.

6. The method of claim 2 wherein one of the first classification model, the second classification model, or the third classification model is Naïve Bayes.

7. The method of claim 6 wherein one of the first classification model, the second classification model, or the third classification model is K-Nearest-Neighbors.

8. The method of claim 7 wherein one of the first classification model, the second classification model, or the third classification model is Multiclass Perceptron.

9. The method of claim 6 wherein one of the first classification model, the second classification model, or the third classification model is Multiclass Perceptron.

10. The method of claim 2 wherein one of the first classification model, the second classification model, or the third classification model is K-Nearest-Neighbors.

11. The method of claim 10 wherein one of the first classification model, the second classification model, or the third classification model is Multiclass Perceptron.

12. The method of claim 2 wherein one of the first classification model, the second classification model, or the third classification model is Multiclass Perceptron.

13. The method of claim 2 further comprising:
evaluating, with the first at least one processor, whether the fourth classification of the particular product and the first classification of the particular product are not identical but near each other in the top-down hierarchy within the predetermined equivalence threshold; and
adding, with the first at least one processor, the description of the particular product to the existing database of product offerings at the first classification of the particular product when the first classification of the particular product and the fourth classification of the particular product are not identical but near each other in the top-down hierarchy within the predetermined equivalence threshold.

14. A computerized method of categorizing new products that are being added to an existing database of product offerings, the method comprising:
receiving, with at least one processor, a description of a particular product;
classifying the particular product with the at least one processor using a first classification model and using the description of the particular product to produce a first classification of the particular product;
classifying the particular product with the at least one processor using a second classification model and using the description of the particular product to produce a second classification of the particular product, wherein the second classification model is different than the first classification model;
evaluating, with the at least one processor, whether the first classification of the particular product and the second classification of the particular product are not identical but near each other in a top-down hierarchy within a predetermined equivalence threshold, the predetermined equivalence threshold being one percent of an entire scope of classifications within the top-down hierarchy;
adding, with the at least one processor, the description of the particular product to the existing database of product offerings at each of the first classification of the particular product and the second classification of the particular product when the first classification of the particular product and the second classification of the particular product are not identical but near each other in the top-down hierarchy within the predetermined equivalence threshold, the existing database of product offerings comprising the top-down hierarchy comprising a root level at a top of the top-down hierarchy, a product level at a bottom of the top-down hierarchy, and a product type level located between the root level and the product level; and
when the first classification of the particular product and the second classification of the particular product are not identical and not near each other in the top-down hierarchy within the predetermined equivalence threshold:
sending, with the at least one processor, the description of the particular product and at least a portion of the top-down hierarchy to a first person for classification to be performed by the first person based on the description of the particular product to produce a third classification of the particular product;
sending, with the at least one processor, the description of the particular product and at least a portion of the top-down hierarchy to a second person for classification to be performed by the second person based on the description of the particular product to produce a fourth classification of the particular product, wherein the second person is different than the first person;
evaluating, with the at least one processor, whether the third classification of the particular product and the fourth classification of the particular product are identical or near each other in the top-down hierarchy within the predetermined equivalence threshold; and
adding with the at last one processor, the description of the particular product to the existing database of product offerings at the third classification of the particular product when the third classification of the particular product and the fourth classification of the particular product are identical or near each other in the top-down hierarchy within the predetermined equivalence threshold.

15. The method of claim 14 wherein one of the first classification model or the second classification model is Naïve Bayes.

16. The method of claim 14 wherein one of the first classification model or the second classification model is K-Nearest-Neighbors.

17. The method of claim 14 wherein one of the first classification model or the second classification model is Multiclass Perceptron.

* * * * *